United States Patent [19]

Pennell

[11] Patent Number: 4,651,130
[45] Date of Patent: Mar. 17, 1987

[54] APPARATUS AND METHOD FOR RETAINING PHASE INFORMATION FOR USE WITH A MULTIPLE-COIL INDUCTIVE DISPLACEMENT SENSOR

[75] Inventor: John D. Pennell, Enfield, Conn.
[73] Assignee: United Technologies Corporation, Hartford, Conn.
[21] Appl. No.: 770,168
[22] Filed: Aug. 28, 1985
[51] Int. Cl.⁴ ............................................. H03M 1/00
[52] U.S. Cl. .............................. 340/347 SY; 318/656; 318/657; 318/660; 318/661
[58] Field of Search ................................ 340/347 SY; 318/652–661; 364/816

[56] References Cited

U.S. PATENT DOCUMENTS

| | | |
|---|---|---|
| 3,295,125 | 12/1966 | Idelsohn ................... 340/347 SY |
| 3,504,361 | 3/1970 | Catton ..................... 340/347 SY |
| 3,676,659 | 7/1972 | Asmussen ................. 340/347 SY |
| 3,735,391 | 5/1973 | Games ..................... 340/347 SY |
| 3,878,535 | 4/1975 | Twiss ...................... 340/347 SY |
| 4,328,483 | 5/1982 | Swartz ..................... 340/347 SY |

Primary Examiner—Charles D. Miller
Attorney, Agent, or Firm—Francis J. Maguire, Jr.

[57] ABSTRACT

Phase information in a multiple-coil indictive displacement sensor is retained by summing the excitation signal with each of the secondary signals to provide augmented secondary signals which may then be converted to a digital format. A signal processor may then be employed to extract both the magnitude and phase information from the augmented secondary signals by subtracting the magnitude of the primary excitation signal from each of the augmented secondary signals. The resulting signals retain both phase and magnitude information.

12 Claims, 13 Drawing Figures

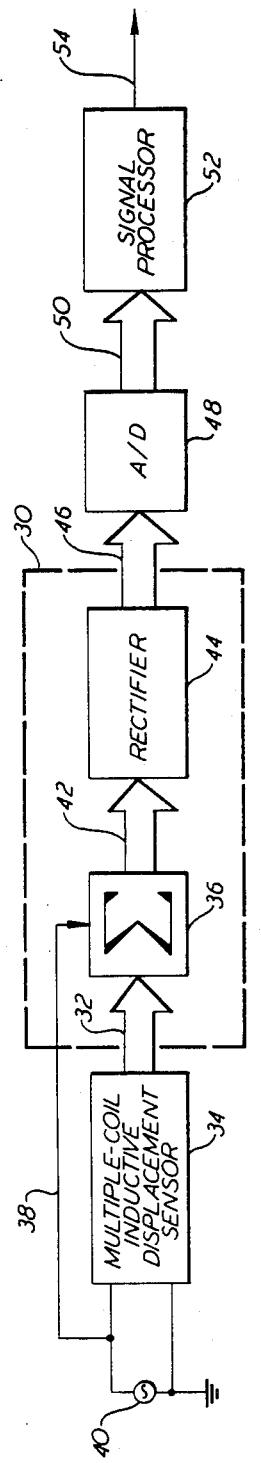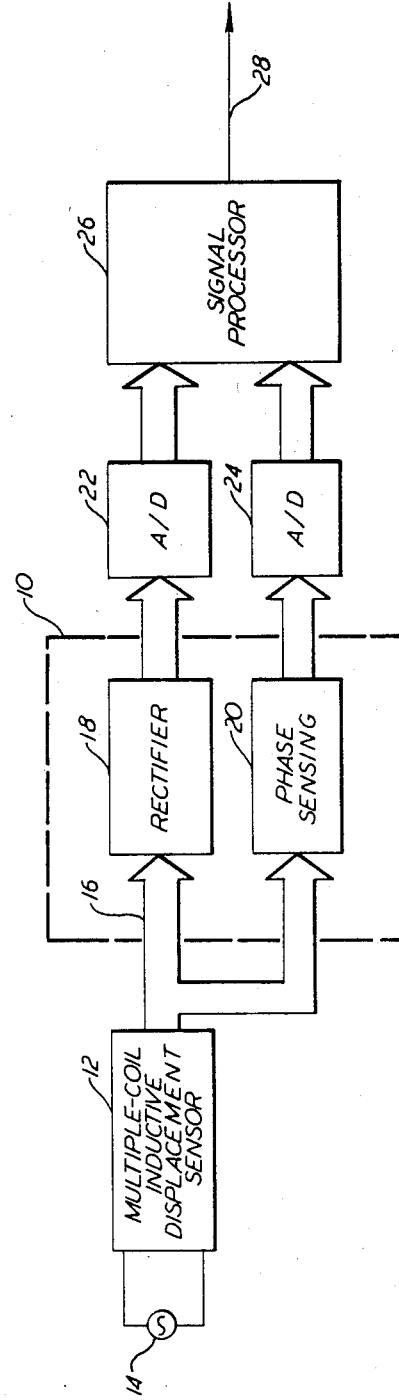

APPARATUS AND METHOD FOR RETAINING PHASE INFORMATION FOR USE WITH A MULTIPLE-COIL INDUCTIVE DISPLACEMENT SENSOR

TECHNICAL FIELD

This invention relates to analog signal conditioning interfaces, and more particularly to a method and apparatus for simply and inexpensively converting AC displacement sensor analog signal information into a form better suited for conversion to a digital signal format.

BACKGROUND ART

Sensors for the measurement of position and displacement may be of the multiple-coil inductive sensor type including the differential transformer and its variations, both linear and rotary, and also synchronous AC generators adapted to serve as variable transformers in the measurement of angular position.

The linear variable differential transformer (LVDT) uses three windings and a moveable core to sense linear displacement. A primary winding, two secondary windings, and a moveable core are energized at the primary with an alternating current. The two secondary windings are connected in series opposition, so that the transformer output is the difference of the two secondary voltages. When the core is centered, the two secondary voltages are equal and the transformer output is zero. This is the balance or null position. When the core is displaced from the null point, the two secondary voltages are no longer equal in magnitude and the transformer produces an output voltage. Motion of the core in the opposite direction produces a similar effect with 180° phase reversal of the alternating output voltage, i.e., the phase angle is positive (no phase shift with respect to the excitation) or negative (180° phase shift with respect to the excitation) depending on which side of null the core is positioned. A demodulator circuit can be used to produce a DC output from this winding configuration. Differential transformers are also available in a rotary version for angular measurement in which the core rotates about a fixed axis. A product detector is normally used for sensing phase reversal when passing through the null point.

Other winding configurations are used in synchros, resolvers and microsyns.

The construction of a synchro is similar to that of a miniature three-phase synchronous motor or generator. The stator contains a three-phase winding and the rotor is excited with a constant single phase AC voltage while the shaft moves at low speeds or stays stationary. Basically the synchro is a transformer with one primary (the rotor) and three-secondaries (the Y-connected windings of the stator). The voltages induced in the secondary windings are proportional to the cosines of the angles between each stator coil and the rotor.

A resolver synchro is similar to a synchro generator in construction, but the stator contains only two windings oriented at 90° relative to each other, and they are employed to resolve rotor position into sine and cosine component voltage signals.

The various types of displacement sensors may be used in computing servomechanisms and other electro-mechanical computers. When used in digital computers, it is necessary to convert the analog signal information into digital words for use by the signal processor. Usually, a rectification process is utilized to convert time-varying secondary output signals, having a zero average, into a rectified signal having a DC average value. Unfortunately, this process destroys the phase information contained in the secondary output signals. Unless the information is extracted before rectification and later converted to useful digital information as well, the displacement sensor will necessarily be restricted to operation in a limited range. Thus, an LVDT would be restricted to use on one or the other side of the null point while a synchro resolver would be restricted to operation in one quadrant only.

It would be useful to have a simple and inexpensive means of obtaining this phase information.

DISCLOSURE OF THE INVENTION

The object of the present invention is to provide a simple apparatus and method for retaining both amplitude and phase information in the signal derived from the secondary coils of a multiple-coil inductive displacement sensor and applied to a rectifier for conversion to a digital format.

According to the present invention, signal conditioning apparatus and methodology is disclosed for simply retaining amplitude and phase intelligence in the output signals from a displacement sensor. This is achieved by summing the primary excitation signal to each of the secondary output signals for providing augmented secondary output signals to a full wave recitifer which separately rectifies the augmented secondary output signals and the primary excitation signal as well and provides each of the rectified signals as a separate output signal for use by an analog-to-digital converter. The central teaching of the present invention is that the amplitude and phase information may be later recovered by simply subtracting the magnitude of the primary excitation signal from each of the augmented secondary output signal magnitudes. The only requirement imposed on the magnitudes of the input signals is that the primary signal have an amplitude greater than or equal to each of the secondary signals. Typically, the resulting signals, true in phase and amplitude, may then be used in a position calculation which is unrestricted with respect to the full capabilities of the displacement sensor.

In further accord with the present invention, the method of summing the primary excitation signal to each of the secondaries may be accomplished in the apparatus of the present invention by making a direct connection between one side of the primary excitation and a common connection between the secondaries. Alternatively, summing may be accomplished in a less error susceptible manner by separately inputting each secondary signal and the primary signal to a summing circuit which may be separate or part of the full wave rectifier as described herein.

Of course, the signal conditioning apparatus of the present invention may be incorporated in a signal conditioning apparatus which includes analog-to-digital conversion means and signal processing means. Thus, the rectified and augmented secondary output signals may be provided to an analog-to-digital converter which provides digital word signals indicative of the magnitudes of both the primary and augmented secondary signals. The signal processor recovers the amplitude and phase information from the augmented secondary signals by subtracting the magnitude of the rectified primary excitation signal (in digital form) from the magnitude of each of the rectified and augmented secondary signals. The subtraction recovers both the true amplitude and phase information which existed prior to the summing operation. If the value of the result of the subtraction process is negative the input signal phase is negative. Conversely, if the value is positive the input signal phase is positive. The signal processor may than obtain an indicated position by performing a signal conversion algorithm or alternatively, by implementing a table look-up of known relationships of signal value to position value. The signal phase information is used during the signal conversion to obtain an unrestricted range of the sensor position. It will be understood, however, that the method of signal conversion used to determine position value is not restricted to the techniques cited above.

Thus, the present invention provides simple and inexpensive means of retaining both amplitude and phase information in a signal conditioning apparatus in which the position determination may later be accomplished largely algorithmically in a signal processor rather than by means of hardware.

The foregoing and other objects, features and advantages of the present invention will become more apparent in the light of the following detailed description of the preferred embodiments thereof as illustrated in the accompanying drawing.

BRIEF DESCRIPTION OF THE DRAWING

FIG. 1 is an illustration of a signal conditioning circuit for use with a multiple-coil inductive displacement sensor, according to the present invention;

FIG. 2 is an illustration of a prior art signal conditioner;

BEST MODE FOR CARRYING OUT THE INVENTION

Figure 3:
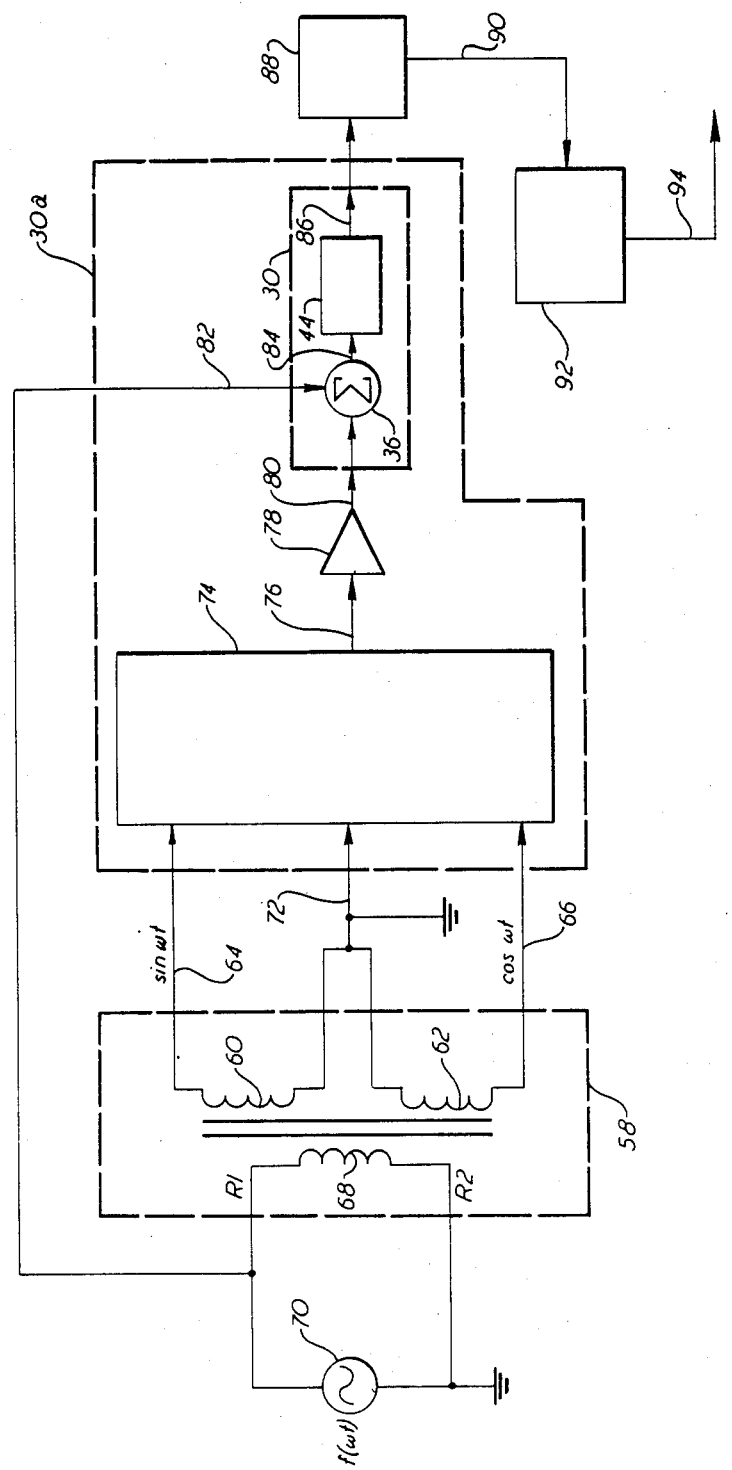
FIG. 3 is a simplified schematic block diagram of signal conditioning circuit, according to the present invention.

FIG. 2 contains an illustration of a prior art signal conditioning circuit 10 for a multiple-coil inductive displacement sensor 12 which may include a differential transformer, either linear (LVDT) or rotary (RVDT), a synchro, a resolver synchro, etc. The multiple-coil inductive displacement sensor 12 has its primary coil (not shown) excited by a time varying signal source 14 and provides an output signal at its secondaries (not shown) on lines 16 to the signal conditioning circuitry 10 which is required in order to put the output signals on the lines 16 in a better condition for analog-to-digital conversion.

A rectifier is normally utilized in the prior art to convert the zero average signals on the lines 16 to signals having a DC component for conversion to a digital word, although other types of hardware are also used. Unfortunately, these approaches, including the rectification process destroy the phase information contained in the secondary output signals and additional phase sensing circuitry 20 is required in order to retain this information, if desired. Analog-to-digital circuits 22, 24 are responsive, respectively, to the output signals from the rectifier 18 and the phase sensing circuitry 20 for converting the received signals to a digital word format. The digital words are provided to a signal processor 26 which in turn provides a position output signal on a line 28 indicative of the displacement sensed in sensor 12.

FIG. 1 is an illustration of signal conditioning circuitry 30, according to the present invention, in which secondary output signals on lines 32 from a multiple-coil inductive displacement sensor 34 are summed in a summer 36 with an excitation signal on a line 38 from a time-varying excitation source 40. The resulting augmented secondary output signals on lines 42 are rectified in a rectifier 44 which provides rectified augmented secondary output signals on lines 46 to an analog-to-digital converter 48. Digital words, equivalent to the augmented rectified signals on the lines 46 are provided on lines 50 to a signal processor 52 which, in turn, provides an output signal on a line 54 indicative of the displacement sensed by the sensor 34. The signal conditioning circuitry 30 may include a multiplexer, as described more fully below, responsive to both the excitation signal on the line 38 and the augmented secondary signals on the lines 42 which sequentially selects among these various signals for sequential presentation to the rectifier 44. Or, the excitation signal on the line 38 may be directly added to a common junction between the secondary coils of the multiple-coil inductive displacement sensor 34 so that the augmentation process takes place in the sensor itself. In that case, the multiplexer would still be upstream of the rectifier but no summer 36 would be required in the signal conditioning circuitry.

The signal processor 52 receives digital words indicative of the magnitudes of the excitation signal and the augmented secondary signals and, according to the central teaching of the present invention, simply subtracts the magnitude of the excitation signal from each of the magnitudes of the augmented secondary signals to obtain correct amplitude and phase information.

FIG. 3 is an illustration of a signal conditioning circuit 30a, according to the present invention, which is designed for use with a synchro resolver 58 having only two windings oriented at 90° relative to each other which provide sine and cosine output signals, respectively, on lines 64, 66 to the signal conditioning circuitry 30a. The resolver primary 68 excited by a time-varying excitation source 70 which would typically be, as in the illustrated case, a sinusoid. The signal conditioning circuitry 30a is also responsive to a secondary common signal on a line 72 tied to ground. A multiplexer 74 is responsive to the sine signal on the line 64, the cosine signal on the line 66, and the common signal on the line 72. It may be controlled synchronously with respect to an associated signal processor, or asynchronously. Synchronously controlled multiplexers are described in U.S. Pat. Nos. 4,340,881 and 4,375,636, both assigned to the owner of the present application and both of which are hereby expressly incorporated by reference in their entireties. The multiplexer sequentially selects each of the signals for sequential presentation on a line 76 to a buffer 78 which, in turn, presents the signals sequentially on a line 80 to signal conditioning circuit 30 similar to that shown in FIG. 1. It includes a summer 36 and rectifier 44. The summer 36 is responsive to the signal on the line 80 from the buffer 78 and to an excitation signal on a line 82. The summer 36 augments the signal on the line 80 and presents an augmented signal on a line 84 to the rectifier 44. The augmented signals are rectified and presented on a line 86 to an analog-to-digital converter 88 which converts the DC magnitudes to equivalent digital words for presentation on a line 90 to a signal processor 92. The signal processor 92 subtracts the magnitude of the excitation signal from the magnitudes of the augmented secondary signals in order to recover true amplitude and phase information. The measured position is then calculated and a signal on a line 94 indicative thereof is provided.

Figure 4:
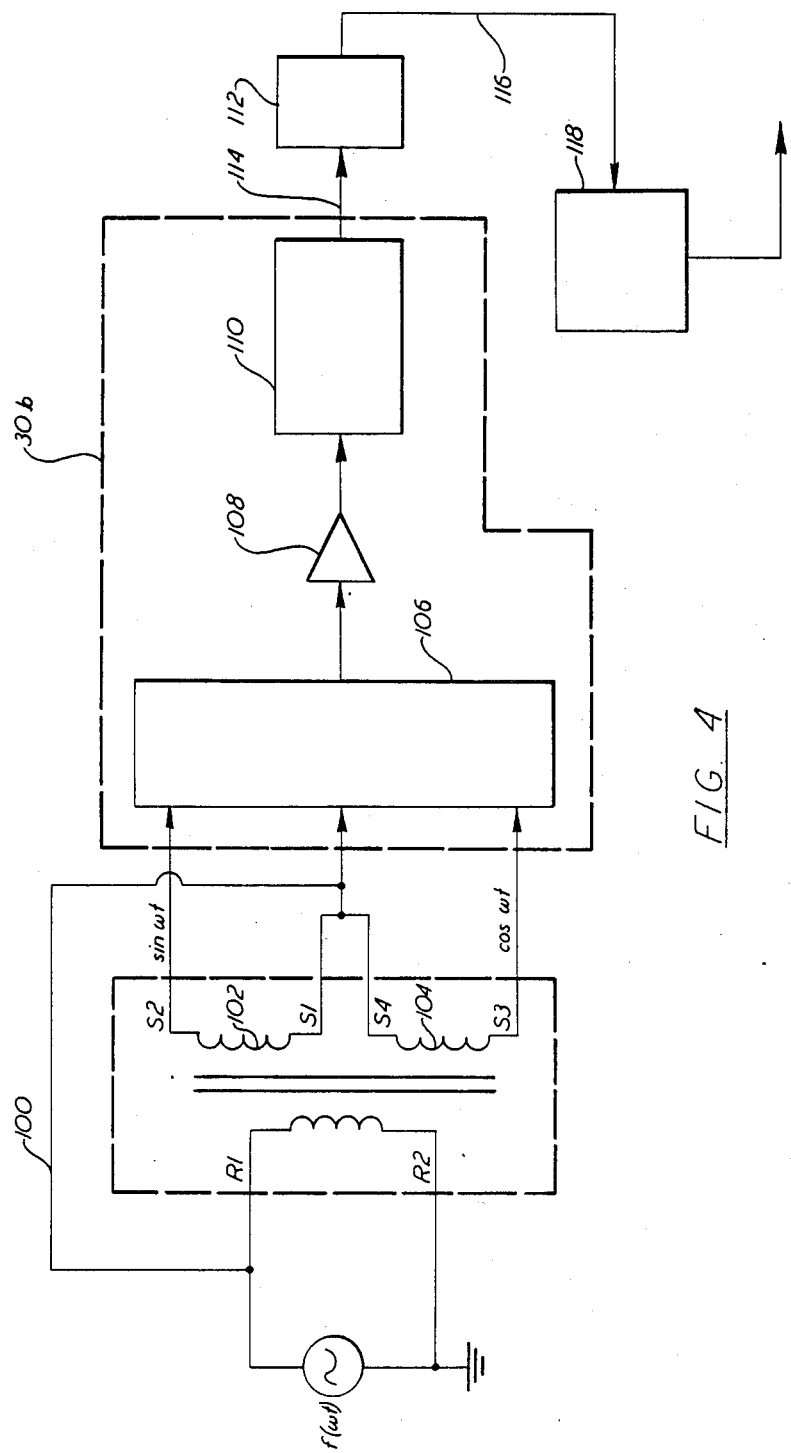
FIG. 4 is a simplified schematic block diagram illustration of another signal conditioning circuit, according to the present invention.

Of course, as explained above in connection with FIG. 1, the augmentation process need not take place in the signal conditioning circuitry 30, but may instead take place within the multiple-coil inductive displacement sensor itself. As shown in FIG. 4, for example, an excitation signal on a line 100 is connected directly to the common connection between two secondary coils 102, 104. In this case, it is unnecessary to provide the excitation signal separately with respect to ground. In other words, in FIG. 3, the ground voltage on the line 72 is periodically multiplexed onto the line 76 for summation with the excitation signal on the line 82 in the summer 36 for later conversion to a digital word and ultimate subtraction from the augmented secondary signals. In FIG. 4, on the other hand, the value of the excitation signal on the line 100 is already present at the input of a multiplexer 106 and is simply provided sequentially along with the secondary voltages with no later augmentation since the primary excitation voltage is already added in at the common junction. A signal conditioning circuit 30b similar to circuit 30 of FIG. 1 and circuit 30a of FIG. 3, contains a buffer 108 and a rectifier 110 in addition to multiplexer 106. An A/D converter 112 receives the rectified excitation and rectified augmented secondary signals on a line 114 for conversion to digital words on a line 116. A signal processor 118 subtracts the magnitude of the excitation signal from each of the augmented secondary signals and calculates the sensed position, including phase.

Figure 5:
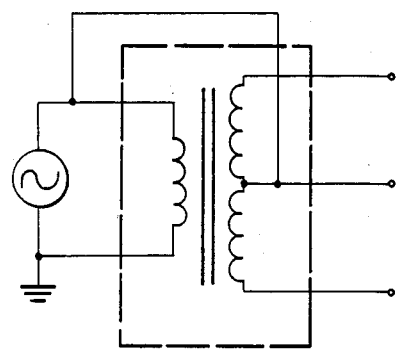
FIGS. 5, 6, and 7 are simplfied illustrations of various multiple-coil inductive displacement sensors having their primary excitation source summed at a common node within the stator.
Figure 6:
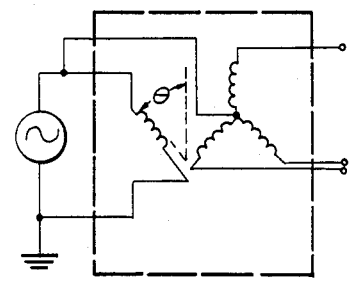
Figure 7:
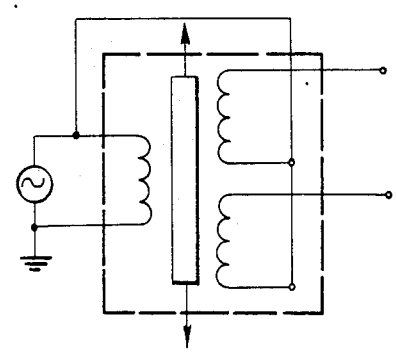

Of course, a similar technique could be used for any of the other different types of multiple-coil inductive displacement sensors. For example, in FIG. 5 is shown a resolver synchro hook-up similar to that of FIG. 4. FIG. 6 shows a synchro hook-up where the excitation is hooked into a common point that joins a three winding stator. FIG. 7 shows a common connection in a differential transformer which would be used in an LVDT or RVDT. The hook-up shown in FIGS. 5, 6, and 7 is usually acceptable for systems in which cable length between transducer and the signal conditioning circuitry is small. In systems in which cable length is large or conversion accuracy is critical the technique of FIG. 3 is preferred.

Figure 8:
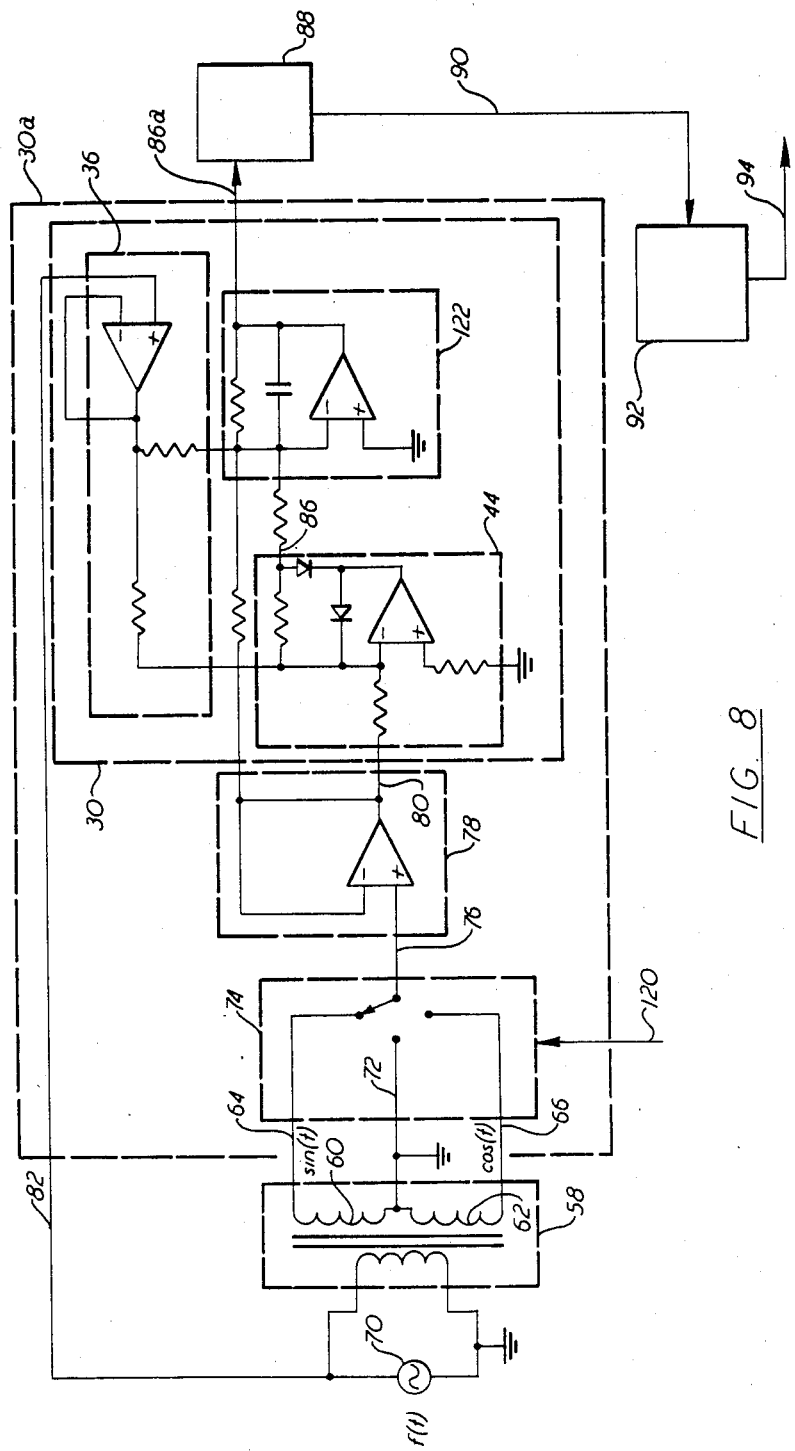
FIG. 8 is a more detailed schematic block diagram illustration of the signal conditioning circuit, according to the present invention, of FIG. 3.

FIG. 8 shows the signal conditioning circuitry 30a of FIG. 3 in more detail. The multiplexer 74 is shown controlled by a external signal on a line 120 which causes the multiplexer to sequentially output the signals on the lines 64, 72, and 66 on the line 76 to the buffer 78. The buffered signal on the line 80 is provided to a circuit 30 which includes summing means 36 for summing the magnitude of the excitation signal on the line 82 to a rectified signal on the line 86 from the rectifier 44. A filter 122 may also be used to smooth the rectified signal on the line 86 to provide a smoothed signal on a line 86a to the A/D converter 88 for conversion to digital words on line 90 to signal processor 92. Of course, a filter would not be used for a synchronously controlled circuit such as disclosed in the above cited U.S. Pat. Nos. 4,340,881 and 4,375,636. Finally, the output signal on the line 94, as in FIG. 3, is indicative of the sensed position sensed by the sensor 58.

Figure 9:
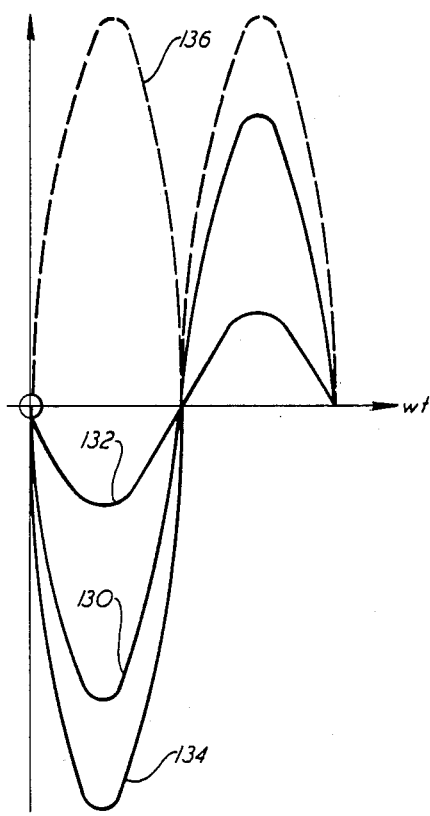
FIGS. 9 and 10 are waveform illustrations illustrating some of the signals present in FIGS. 3 and 8.

FIG. 9 is an illustration of some of the waveforms which appear in the circuitry of FIGS. 3 and 8 and are illustrative, albeit in a special case relating only to a synchro resolver, of the types of signal manipulations which are made possible by the signal conditioning circuitry of the present invention. The particular synchro resolver illustrated is operating in quadrant IV. Of course, it will be understood by those skilled in the art that the teachings disclosed herein are broadly applicable to a wide variety of multiple-coil inductive displacement sensors, each having distinctive output waveforms. It is a common feature of each, however, that phase information may be retained using the simple approach of the methods and apparati disclosed herein. Thus, a waveform 130 is illustrative of the time-varying primary excitation signal provided on the line 82 to the summer 36. Waveform 132 is illustrative of the signal on the line 66 from one of the secondaries 62 of the displacement sensor 58. When the signal on the line 66 is multiplexed into the summer 36 it becomes augmented by the larger magnitude primary signal on the line 82 resulting in a signal on the line 84 illustrated by a waveform 134 in FIG. 9. This signal is rectified by the rectifier 44 which provides a rectified augmented signal on the line 86 illustrated by waveform 136 (shown by dashed lines) in FIG. 9. This rectified augmented signal contains not only amplitude information but phase information which may be recovered in the signal processor by simply subtracting the magnitude of the excitation signal.

Figure 10:
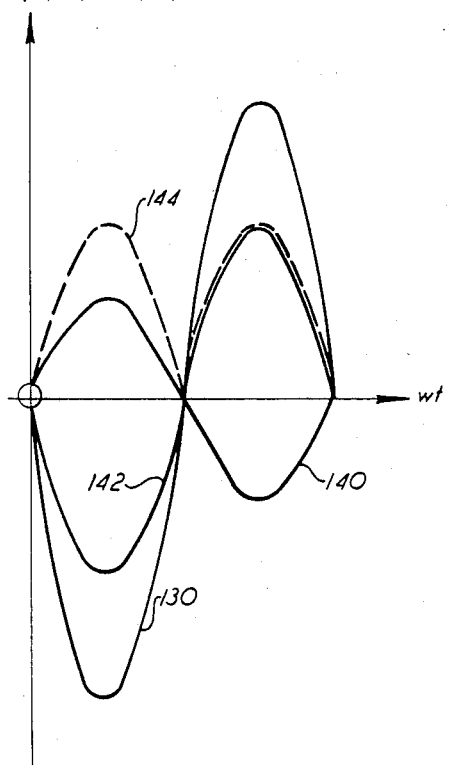

FIG. 10 is an illustration similar to that of FIG. 9 except showing a waveform 140 illustrative of the sine output signal on the line 64 of FIGS. 3 and 8. The resolver of FIG. 10 is also positioned in quadrant IV. The primary excitation signal 130 is the same as in FIG. 9. The summation of the two signal waveforms 130, 140 results in a "augmented" signal waveform 142, which in this case represents a secondary output signal "augmented" in the sense of having a signal 180° out of phase with it added thereto. A rectified version of the "augmented" signal is illustrated by a dashed waveform 144.

Figure 11:
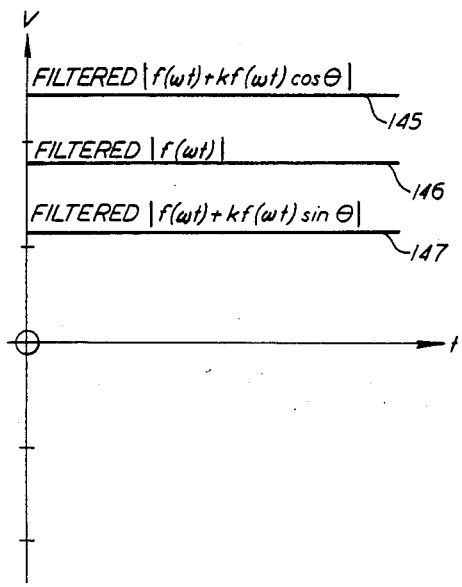
FIGS. 11 and 12 are waveforms illustrations which illustrate several filtered signal values.

FIG. 11 illustrates the rectified and filtered signal values as presented on line 90 of FIGS. 3 and 8 to the signal processor 92. A signal value 145 is obtained by filtering the rectified augmented secondary waveform 136 of FIG. 9. A signal value 146 is obtained by filtering a rectified version of the primary signal 130 of FIG. 9. A signal value 146 is obtained by filtering the rectified augmented secondary waveform 144 of FIG. 10.

Figure 12:
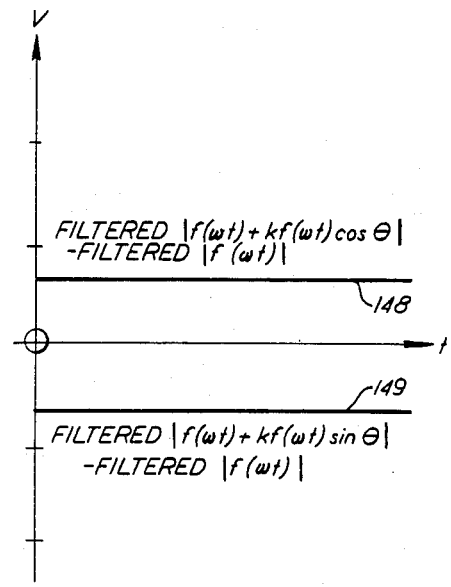

FIG. 12 illustrates the signal values calculated by the signal processor 92 by subtracting the primary signal value 146 of FIG. 11 from each of the augmented secondary values 145 and 147. A signal value 148 is obtained by subtracting the primary signal 146 from the augmented secondary signal value 145. This value is the recovered true amplitude and phase value of the sensor output signal on the line 66 of FIGS. 3 and 8. A value 149 is the result of subtracting the primary signal 146 from the augmented secondary value 147. The value 149 is the recovered true amplitude and phase value of the sensor output signal 64. The signal processor 92 completes the sensor position determination by executing the signal conversion algorithm using the recovered values 148 to 149 which results in the sensor position signal on line 94.

Figure 13:
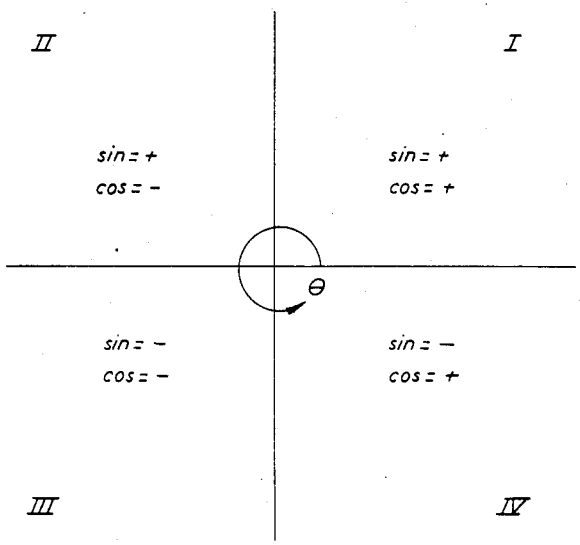
FIG. 13 is an illustration of the four quadrants to be sensed in a two-coil secondary rotary displacement sensor and the signs of the two output signals thereof.

FIG. 13 illustrates the four quadrants which must be sensed in a full (360°) rotation synchro resolver. The various phase changes for the different quadrants are illustrated by plus and minus signs. Thus, if both the sine and cosine signals from the secondaries of the displacement sensor have positive values then the inference may be made that the sensed angle is in quadrant one. Similarly, for other combinations of sine and cosine signs one can infer which quadrant the sensor is operating in. Thus, if the signal processor contains a table of trigonometric, e.g., arctangent values, all that need be done is to divide the signed magnitudes of the augmented secondary signals minus the excitation signal to obtain the proper position signal. This may be illustrated by the following algorithm:

$$\theta = \arctan \left[ \frac{(\text{sine} + \text{excitation}) - \text{excitation}}{(\text{cosine} + \text{excitation}) - \text{excitation}} \right]$$

Thus, to retain the phase information of the signals from the stator coils, each stator voltage is summed with the excitation. The excitation is larger than the stator signals (sine or cosine) due to the transformation ratio of the resolver, and the summing operation transforms the amplitude and phase information to amplitude information only. The augmented signals are now input to the analog-to-digital converter which generates a digital value for each. Also, the excitation is input as a third signal to the analog-to-digital converter and a digital word is generated for it as well. The sine and cosine values including phase (sign) value are recovered by subtracting the excitation value from the augmented values. Since the sign value of both the numerator and denominator are recovered as a result of the subtraction, the quadrant can be defined and four quadrant conversion is achieved using very simple circuitry.

Although the invention has been shown and described in detail with respect to a best mode embodiment thereof, it should be understood by those skilled in the art that various other changes, omissions, and additions may be made thereto without departing from the spirit and the scope of this invention.

I claim:

1. Signal conditioning apparatus for simply retaining amplitude and phase intelligence in the output signals from a displacement sensor having a primary excited by a signal having a time varying amplitude and at least two secondaries which provide the output signals displaced in phase by a fixed amount from one another, comprising:

summing means, responsive to the primary excitation signal and the secondary output signals for summing a signal manifestation of the primary excitation signal (having a peak amplitude greater than or equal to the peak amplitudes of each of the secondary output signals) to each of the magnitudes of the secondary output signals for providing augmented secondary output signals; and full-wave rectifier means, responsive to the primary excitation signal and to each of said augmented secondary output signals for providing a rectified primary excitation signal and for providing rectified augmented secondary output signals having magnitudes indicative of both the amplitudes of the secondary output signals and the phase relationship between each secondary output signal and the primary signal, wherein the amplitude and phase information may be recovered by subtracting the magnitude of the primary excitation signal from each of the augmented secondary output signal magnitudes.

2. The signal conditioning apparatus of claim 1, wherein said summing means comprises a direct connection between one side of the primary excitation and a common connection between the secondaries.

3. The signal conditioning apparatus of claim 1, wherein said summing means comprises buffer means responsive to the secondary output signals at an input or inputs thereof and to the primary excitation signal at an output thereof for summing the primary excitation signal to the buffered secondary output signals.

4. The signal conditioning apparatus of claim 1, further comprising multiplexer means responsive to the primary excitation signal and said augmented secondary output signals for sequentially providing the primary excitation and each of said augmented secondary output signals at a multiplexer output signal line to said full-wave rectifier means.

5. The signal conditioning apparatus of claim 1, further comprising buffer means responsive to the primary excitation signal and said augmented secondary output signals for providing a buffered primary excitation signal and buffered augmented secondary output signals to said full-wave rectifier.

6. The signal conditioning apparatus of claim 1, further comprising analog-to-digital converter means, responsive to said rectified and augmented secondary output signals for providing digital word signals indicative of the magnitudes thereof.

7. The signal conditioning apparatus of claim 1, further comprising signal processing means, responsive to said rectified and augmented secondary output signals and to the rectified primary excitation signal for subtracting the magnitude of the rectified primary excitation signal from the magnitude of each of said rectified and augmented secondary output signals for providing true amplitude and phase information in the output signals.

8. A method for simply retaining amplitude and phase intelligence in the output signals from a displacement sensor having a primary excited by a signal having a time varying amplitude and at least two secondaries which provide the output signals displaced in phase by a fixed amount from one another, comprising the steps of:

summing a signal indicative of the magnitude of the primary excitation signal having a peak amplitude greater than or equal to the peak amplitudes of each of the secondary output signals, to each of the magnitudes of the secondary output signals for providing augmented secondary output signals; and rectifying the primary excitation signal and each of the augmented secondary output signals and providing a rectified primary excitation signal and providing rectified augmented secondary output signals having magnitudes indicative of both the amplitudes of the secondary output signals and the phase relationship between the secondary output signals, wherein the amplitude and phase information may be recovered by subtracting the magnitude of the primary excitation signal from each of the augmented secondary output signal magnitudes.

9. The method of claim 8, whereby the summing step is accomplished by making a direct connection between one side of the primary excitation and a common connection between the secondaries.

10. The method of claim 8, whereby the step of summing is accomplished by adding the primary excitation signal to buffered secondary output signals.

11. The method of claim 8, including the step of converting the rectified and augmented secondary output signals into digital word signals indicative of their magnitudes.

12. The method of claim 8, further comprising the steps of:
   subtracting the magnitude of the rectified primary excitation signal from the magnitude of each of the rectified amd augmented secondary output signals; and
   providing output signals having amplitude and phase information retained.

* * * * *

UNITED STATES PATENT AND TRADEMARK OFFICE
CERTIFICATE OF CORRECTION

PATENT NO. : 4,651,130

DATED : March 17, 1987

INVENTOR(S) : John D. Pennell

It is certified that error appears in the above-identified patent and that said Letters Patent is hereby corrected as shown below:

Page 1, line 1 in the "Abstract" "indictive should be --inductive--

Column 10, Claim 12, line 12 "amd" should be --and--

Signed and Sealed this

Twenty-fifth Day of August, 1987

Attest:

DONALD J. QUIGG

*Attesting Officer*   *Commissioner of Patents and Trademarks*